United States Patent [19]

Marshall

[11] Patent Number: 5,001,333
[45] Date of Patent: Mar. 19, 1991

[54] METHOD AND APPARATUS FOR FOCUS ERROR COMPENSATION HAVING PATH LENGTH INDEPENDENCE

[75] Inventor: Daniel R. Marshall, Boise, Id.

[73] Assignee: Hewlett-Packard Company, Palo Alto, Calif.

[21] Appl. No.: 427,288

[22] Filed: Oct. 24, 1989

[51] Int. Cl.$^5$ ............................................. G01J 1/20
[52] U.S. Cl. ............................ 250/201.5; 369/44.23
[58] Field of Search ............... 250/201.5, 204; 369/44, 369/45, 46, 44.23, 44.24

[56] References Cited

U.S. PATENT DOCUMENTS

| | | | |
|---|---|---|---|
| 4,652,737 | 3/1987 | Kowalski et al. | 250/204 |
| 4,764,912 | 8/1988 | Ando et al. | 369/45 |
| 4,773,053 | 9/1988 | Gottfried | 369/45 |
| 4,779,250 | 10/1988 | Kogure et al. | 369/13 |
| 4,797,868 | 1/1989 | Ando | 369/44 |

OTHER PUBLICATIONS

Lee Wai-Hon, "Optical Technology for Compact Disk Pickups," Laser and Optronics, pp. 85-87, (Sep. 1987).

*Primary Examiner*—David C. Nelms

[57] ABSTRACT

A method and apparatus for generating a focus error signal from a beam of light reflected from an optical surface, is shown to include a beamsplitter for splitting the reflected light beam into first and second beams, first and second detectors for generating first and second detection signals representative of light on said detectors, a first lens having a first focal length for focusing the first beam at a first focal point, wherein the first detector is positioned in the convergent portion of the focused first beam so that the ratio of the distance of the first detector from the first lens to the first focal length is a first value, a second lens having a second focal length, different from the first focal length for focusing the second beam at a second focal point, wherein the second detector is positioned in the convergent portion of the focused second beam so that the ratio of the distance of the second detector from the second lens to the second focal length is a second value equal to the first value, and a differencing circuit for subtracting the signals generated by the first and second detectors thereby generating a focus error signal. Such apparatus and method has excellent rejection of beam pattern noise, i.e., spatial variations of optical power unrelated to the state of focus of the beam and is suitable for incorporation in a split optics information system.

6 Claims, 2 Drawing Sheets

METHOD AND APPARATUS FOR FOCUS ERROR COMPENSATION HAVING PATH LENGTH INDEPENDENCE

FIELD OF THE INVENTION

The present invention generally relates to the field of optical information storage systems and more particularly to devices utilized in such systems to generate focus error signals so that light can be precisely focused onto a given magneto-optical media.

BACKGROUND OF THE INVENTION

A hybrid of the optical and magnetic information storage systems, so called magneto-optical information storage systems, appears to have the potential to not only to increase storage capacity but also to resolve the problem of erasure of optical information and rewrite new optical information. In most previous optical systems it has not been possible to erase and rewrite information. It has been estimated that the theoretical upper limit of the storage capacity of such systems can be as high as 300 megabytes per square inch of media. In practice on a 5.25 inch disc, storage capacities as high as 400 to 800 megabytes can be expected.

Often, all of the components necessary to detect data in a magneto-optical system are included in a so-called optical head. As will be appreciated, in order to access data, the optical head is moved radially by an actuator mechanism across the surface of the rotating disc. Unfortunately, one obstacle to commercial acceptance of such magneto-optical systems is the relative slowness by which information can be retrieved compared to contemporary rigid disk magnetic storage systems. The primary factor contributing to the slow access performance of present optical storage systems is the mass of the moving optical head assembly. As will be appreciated, the greater the mass of a device for reading from or writing to an optical disc, the more difficult to accelerate such a device in relation to precise locations on a rotating disc.

One scheme for reducing the moving mass of the optical system has been to split the optical assembly into a subassembly of fixed components which remain stationary relative to the actuator mechanism and a subassembly of moving components of minimum mass and maximum robustness. As used herein such a system is referred to as a split optical system.

When reading information from or writing information onto a magneto-optical disk, or any optical disk, it will be necessary to maintain the radial position of the light beam focused by the objective lens on track as the disk rotates. Such an operation is known as track following. Track following requires the generation of a radial position (tracking) error signal. It will also be appreciated from the above that because relatively small magnetic domains will be recorded, read and erased, it is important to maintain a focused spot of light on the desired track. Maintaining the focus of the light beam requires the generation of a focus (axial) error signal. Each of these signals, the tracking (radial position) error signal and the focus (axial position) error signal, can be calculated based on signals generated by segmented detectors whose outputs are differenced (subtracted) in various ways to produce these error signals.

Light reflected from a grooved magneto-optical disk directed onto the detectors will form a sheared interferogram. That is, when light is focused on a spot on grooved media, such as that used in optical and magneto-optical disks, the reflected light contains a series of orders of diffraction each having an axis deviated from the central axis. These diffraction orders normally overlap producing the sheared interferogram. When sampled properly, the sheared interferogram can be used to generate the tracking error signal. The focus error signal can be derived in a varied assortment of ways.

In one method of focus detection, the detector in effect senses the diameter of the reflected beam of light, i.e. an illuminated spot, including the sheared interferogram. Accordingly, focus can be determined by sensing the size of the spot formed by the intersection of the detector with the converging beam. By using a detector shaped like an elongated I (a so-called "I" detector) in a differential detection scheme, focus is determined in accordance with the following formula:

$$FE = (A+D) - (B+C)$$

where FE is the focus error signal and A, B, C and D represent distinct sections in such "I" detectors. This method is sometimes also called "one-dimensional spot size detection".

In addition to the "I" type detector, quadrant type detectors have also been proposed for use in determining tracking error signals and focus error signals. See for example, U.S. Pat. Nos. 4,773,053 - Gottfried, 4,797,868 - Ando and 4,779,250 - Kogure, et al.; and Lee, Wai-Hon, "Optical Technology For Compact Disk Pickups", Lasers and Optronics, pp. 85-87 (September 1987). The problem with such prior techniques for generating tracking error and focus error signals, particularly where split optical components are utilized, is that the system is vulnerable to errors which originate in non-uniform or changing spatial distributions of optical power in the illuminated spot. Such non-uniform or changing spatial distributions can be referred to as "pattern noise". One example of pattern noise is the sheared interferogram described above. Such pattern noise is important because any redistribution of optical power within the illuminated spot, which is not the result of de-focus and which does not maintain an exact balance of optical power between inner and outer elements of the "I" detector, will cause an incorrect indication in the state of focus in the optical system. Such pattern noise can be caused by diffraction from surfaces which define the edge of the optical beam, dust, partial obscuration of the reflected light beam, or by the interference of diffracted orders reflected from the grooved media surface. This pattern noise is intrinsic to, or at the very least difficult to remove from, the beam of light reflected from the optical surface. It can degrade the performance of an optical system to an unacceptable level.

Previously, a number of schemes have been proposed for generating a focus error signal which is uncorrupted by pattern noise. For example, it has been proposed to generate a differential focus error signal by placing spot size detectors on opposite sides of the focal point of a positive lens, as shown in FIG. 1. In such a detection scheme, two light beams are created from an original reflected light beam by means of a semi-transparent, semi-reflective beam splitter. The first detector is placed in the converging portion of the first beam, while the second detector is placed in the diverging portion of the second beam. Each detector creates a focus error signal in the manner described above. However, the slope of the error signal generated by the first detector differs in sign and magnitude from that developed by the second detector. The algebraic difference of these two error signals is a net, differential focus error signal with pattern noise rejection properties.

As shown in FIG. 1, a collimated beam of light is focused by lens 10. The focused beam of light is split by beam splitter 12 into first and second beams 14 and 16. An "I" detector 18 is placed in the convergent portion of beam 14. A second "I" detector 20 is positioned in the divergent portion of beam 16 by positioning beyond focal point 22. Focal point 22, is of course the focal point associated with lens 10. This focus sensing scheme has the virtue of rejecting pattern noise insofar as the two detector irradiance patterns map onto one another.

A problem with the detector scheme of FIG. 1 is that the error signal from the second detector 20 is strongly dependent upon path length between the objective lens and the detectors. Clearly, such a system may not be used in the above described split optical component systems.

Consequently, a need still exists for an apparatus and method capable of generating focus and tracking signals which minimize the effects of pattern noise upon the focus error signal and further which are capable of use in split optical systems.

SUMMARY OF THE INVENTION

The advantages of the invention are achieved in a method and apparatus for generating a focus error signal from a beam of light reflected from an optical surface and are shown to include a beamsplitter for splitting the reflected light beam into first and second beams, first and second detectors for generating first and second detection signals representative of light on said detectors, a first lens having a first focal length for focusing the first beam at a first focal point, wherein the first detector is positioned in the convergent portion of the focused first beam at a location in which the ratio of its distance from the first lens to the first focal length is a first value and the first beam has a first marginal ray height, a second lens having a second focal length for focusing the second beam at a second focal point, wherein the second detector is positioned in the convergent portion of the focused second beam at a location in which the ratio of its distance from the principal plane of the second lens to the second focal length is a second value different from the first value and the second beam has a second marginal ray height and wherein the first and second marginal ray heights are equal and a differencing circuit for subtractively combining the signals generated by the first and second detectors thereby generating a focus error signal. Such apparatus and method has excellent rejection of beam pattern noise, i.e., rejection of spatial variations of optical power unrelated to the state of focus of the beam and is suitable for incorporation in a split optics information system.

BRIEF DESCRIPTION OF THE DRAWINGS

The present invention will be better understood, and its numerous objects and advantages will become apparent to those skilled in the art by reference to the following detailed description of the invention when taken in conjunction with the following drawing, in which.

DETAILED DESCRIPTION OF THE PREFERRED EMBODIMENT

Figure 1:
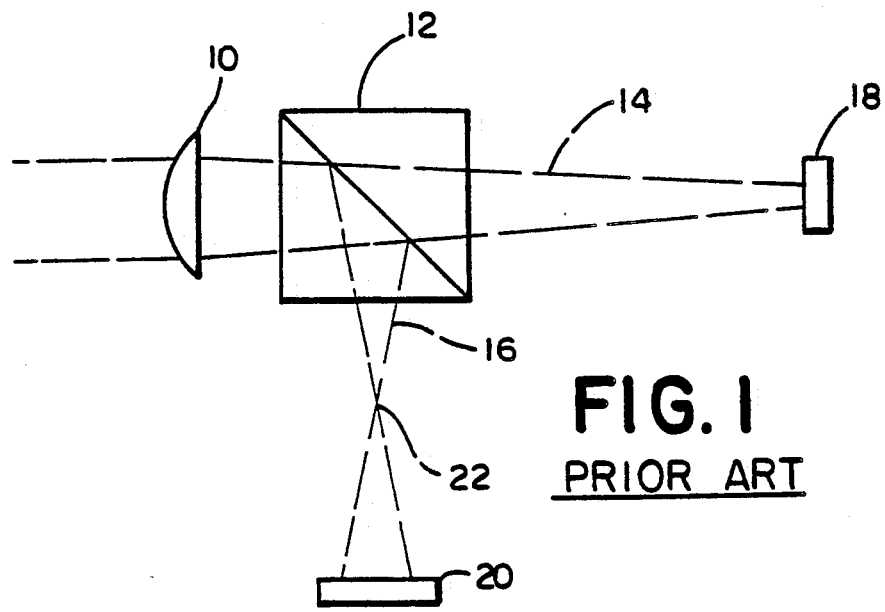
FIG. 1 is a diagrammatic view of a prior art differential detection system.
Figure 2:
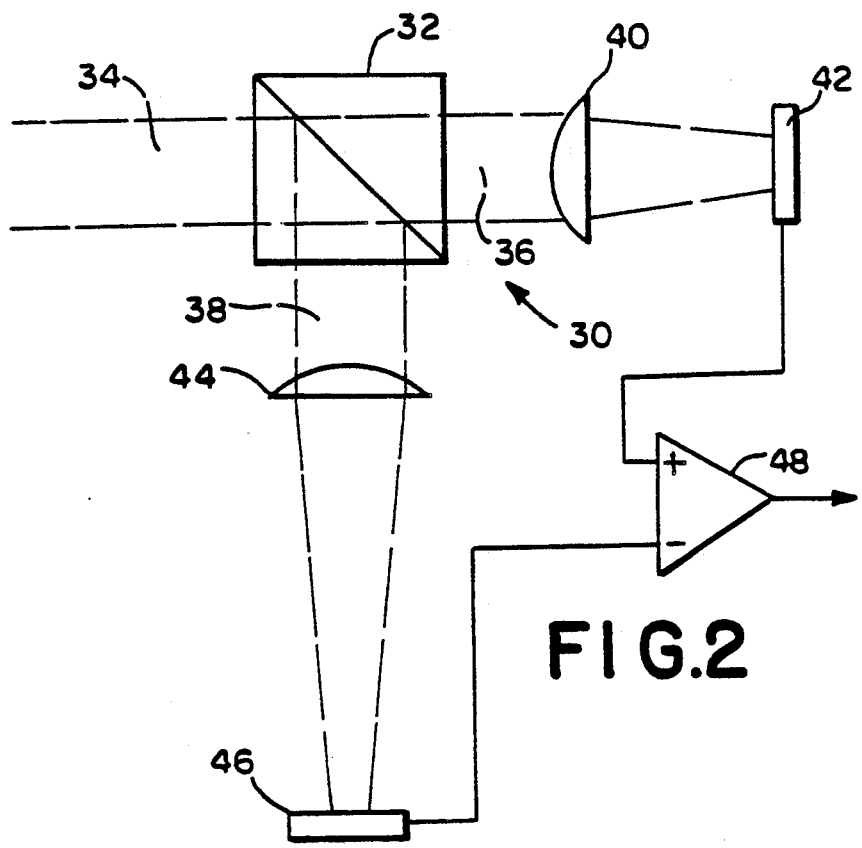
FIG. 2 is a diagrammatic view of a detection system according to the present invention.

A new and novel apparatus for differentially detecting data stored on optical media is shown in FIG. 2 and is generally designated 30.

Apparatus 30 will be seen in the following description to directly address the problem of path length sensitivity while minimizing pattern noise sensitivity present in prior devices. Generally, apparatus 30 divides an incident collimated beam into two nominally equal first and second output beams. First and second lenses are positioned in the first and second beams, respectively, for focusing same onto first and second detectors. If the first and second lenses have equal focal lengths, and the detectors are placed equal distances from each lens on the near side of the focal point, i.e., the "K" values at the detector locations are the same and also the marginal ray height values at the detector locations are the same, two equal signals are generated and the difference of these signals, the error signal, is zero. As used herein, the term K value is equal to the distance of the detector from the lens divided by the focal length of the lens, i.e., $K = l_1/f$. Differencing the signals generated by such detectors would furnish maximum pattern noise rejection, however, a net focus error signal would be identically zero. In the present invention, the two lenses have different focal lengths, however, the detectors are positioned at distances from the lenses in the first values and second output beam so that the "K" values at those detector positions are the same and the illuminated spot on each detectors are the same size. In such a novel situation, two error signals of different slope would be generated. Differencing those error signals produces a net error signal (net focus error signal) having maximum pattern noise rejection because the detectors are in optically similar locations in the two beams.

More particularly, as shown in FIG. 2, a beam splitter 32 divides incident collimated beam 34 into first and second output beams 36 and 38. Beam 36 is focused by lens 40 at a focal point (not shown). As illustrated, detector 42 is positioned on the near side of the focal point of lens 40, i.e. in the convergent portion of the beam. In the focused beam 36 there is a given "K" value or marginal ray height at detector 42.

Second output beam 38 is focused by lens 44 at a second focal point (not shown). Similar to detector 42, detector 46 is positioned on the near side of the focal point of lens 44, in the convergent portion of the beam. In accordance with the principles of the present invention, detector 46 is positioned such that the "K" value at that location of detector 46 in the second beam is identical to the "K" at the location of detector 42 in the value of beam 36. The algebraic difference between the signals generated by detectors 42 and 46 is achieved by applying the signals to the positive and negative inputs of differencing amplifier 48. The output of amplifier 48 is the focus error signal.

In addition to maximizing pattern noise rejection, the invention as described in FIG. 2, is advantageously applicable to a split optical components system in that it is substantially insensitive to variations in the length of the path from the objective lens to focusing lenses 40 and 44. As an example of such an application, consider the split optics optical information storage device shown in FIG. 3.

Figure 3:
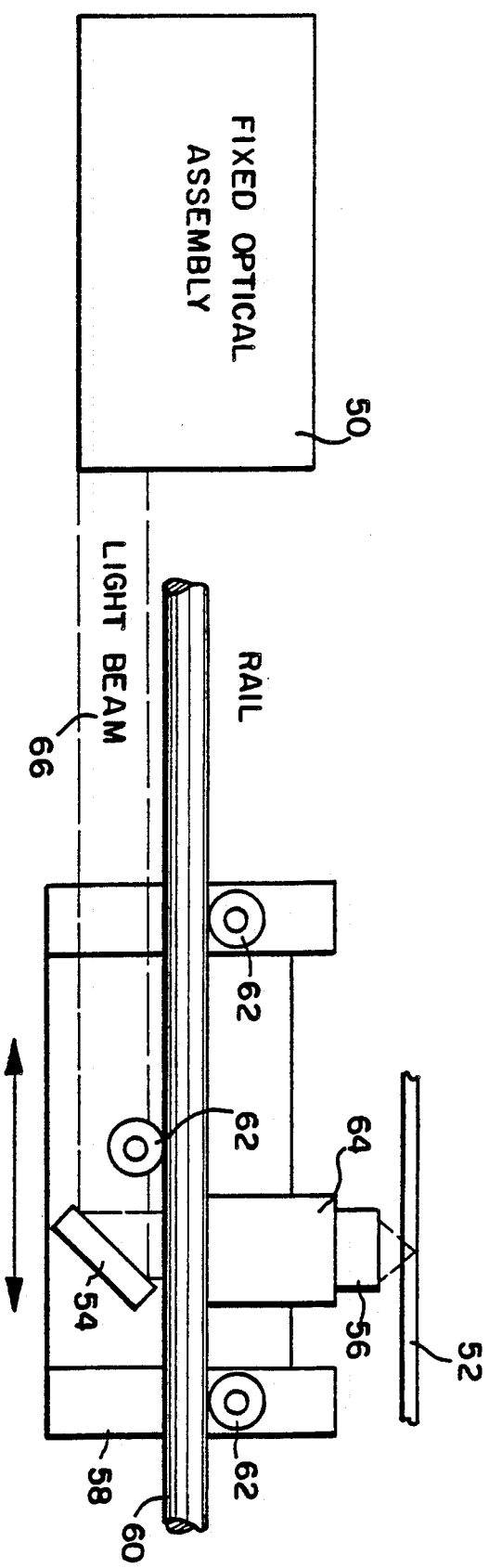
FIG. 3 is a diagrammatic view of a split optics detection system incorporating the present invention.

As shown in FIG. 3, the differential detection apparatus disclosed in FIG. 2, is stored or positioned within the fixed optical assembly 50. Optical assembly 50 can be any fixed structure in the optical information storage device, such as a frame.

As will be appreciated, an optical disk 52 is positioned to rotate within the optical information storage device by known mechanisms (not shown). Light generated by fixed optical assembly 50 is reflected by mirror 54 through objective lens 56 and onto optical disk 52. Incident or reflected light is collimated by lens 56 and reflected by mirror 54 to fixed optical assembly 50 for presentation to apparatus 30. In order to access data from optical disk 52, mirror 54 and objective lens 56 are attached to movable sled 58. Sled 58 moves mirror 54 and objective lens 56 radially with respect to disk 52 along fixed rail 60. A number of wheels or rollers 62 can be provided for movement of sled 58 along rail 60.

Focus mechanism 64, to which objective lens 56 is attached, is also shown as being provided on sled 58. As will be appreciated, focus mechanism 64 serves to move objective lens 56 towards and away from disk 52 in relation or response to the focus error signal generated by the differential detection apparatus. Focus mechanism 64 can be any known device for this purpose. Although not shown, movement of sled 58 along rail 60 can be of any known method.

Additionally, the principles of the present invention can be applied to the split optical components systems by means of actuators other than the linear actuator shown in FIG. 3, for example, a rotary actuator. In the case of rotary actuators, it will of course be necessary to maintain the alignment of the fixed optical assembly and mirror 54 so that light beam 66 is not interrupted. The invention is particularly useful in the case of rotary actuators, where rotation of the orientation of the grooves in the media can be a particularly harmful source of pattern noise.

While the invention has been described and illustrated with reference to specific embodiments, those skilled in the art will recognize that modification and variations may be made without departing from the principles of the invention as described herein above and set forth in the following claims. Although the present invention has been described in relation to sensing the state of focus in an optical recording system, it can clearly be used for focus sensing in any similar optical system, e.g. photolithography or surface metrology.

What is claimed is:

1. Apparatus for generating a signal indicative of the magnitude of a focus error, wherein a reflected beam of light is generated by directing a beam of light onto an optical surface, comprising:

beam splitter for splitting said reflected light beam into first and second beams;

first detector and a second detector for generating first and second detection signals representative of light on said detectors;

first lens having a first focal length for focusing said first beam at a first focal point, wherein said first detector is positioned at a first distance from said first lens in a converging portion of the focused first beam at which the ratio of said first distance to said first focal length is a first value;

second lens having a second focal length different from said first focal length for focusing said second beam at a second focal point, wherein said second detector is positioned at a second distance from said second lens in a converging portion of the focused second beam at which the value of the ratio of said second distance to said second focal length is the same as said first value; and focus error detection means for subtractively combining said first and second detection signals for producing said signal indicative of the magnitude of a focus error.

2. A method for generating a signal indicative of the magnitude of a focus error, wherein a reflected beam of light is generated by directing a beam of focused light onto an optical surface, comprising the steps of:

splitting said reflected beam of light into first and second light beams;

focusing said first light beam at a first focal point using a lens having a first focal length;

positioning a first detector at a first distance from said lens in said first light beam in a converging portion of the focused first light beam at which the ratio of said first distance to said first focal length is a first value;

focusing said second light beam at a second focal point using a second lens having a second focal length different from said first focal length;

positioning a second detector at a second distance from said second lens in said second light beam in a converging portion of the focused second light beam at which the value of the ratio of said second distance to said second focal length is equal to said first value; and subtractively combining said first and second detection signals for generating a signal indicative of the magnitude of a focus error.

3. Apparatus for generating a signal indicative of the magnitude of a focus error in which a reflected beam of light is generated by directing a focused beam of light onto an optical surface, comprising:

a light beam splitter for splitting said reflected beam of light into a first light beam and a second light beam;

a first lens having a first focal length for converging and focusing said first light beam at a first focal point;

a first light detector disposed in the converging portion of the focused first light beam at a first distance from said first lens for producing a first signal;

a second lens having a second focal length different from said first focal length for converging and focusing said second light beam at a second focal point;

a second light detector disposed in the converging portion of the focused second light beam at a second distance from said second lens, which second distance is different from said first distance, for producing a second signal;

the ratio of said first distance to said first focal length being equal to the ratio of said second distance to said second focal length, and means for subtractively combining said first signal and said second signal to produce a signal indicative of the magnitude of a focus error.

4. In an optical apparatus having means for projecting a focused light beam onto an optical surface and means for splitting the reflected light beam which is reflected from the optical surface into a first light beam and a second light beam, means for producing a signal indicative of the magnitude of a focusing error, comprising:

a first focusing lens and a second focusing lens of different focal lengths in said first light beam and said second light beam, respectively, for producing a first converging light beam and a second converging light beam;

a first light detector and a second light detector, each for producing electrical signals when exposed to light, disposed in converging portions of said first converging light beam and said second converging light beam, respectively, at different distances from said first focusing lens and said second focusing lens, respectively, in which the ratios of the respective distances from said first focusing lens and said second focusing lens to the focal lengths of the respective focusing lenses are substantially the same, and means for subtractively combining said electrical signals for producing a signal indicative of the magnitude of a focusing error.

5. A method for generating a signal which is indicative of the magnitude of a focus error, from a reflected beam of light which is produced by directing a focused light beam onto an optical surface, comprising the steps of:

splitting said reflected beam of light into first and second light beams;

focusing said first and second light beams into first and second converging light beams of different focal lengths;

generating first and second electrical signals by detecting said first and second converging light beams at a "K" value location in the converging portions of each thereof at which the "K" values are substantially equal; and subtractively combining said first and second electrical signals for producing said signal indicative of the magnitude of a focus error.

6. In a focus error detection system for an optical memory system including means for splitting light reflected from an optical recording surface into first and second light beams; the improvement comprising:

first and second focusing lenses of first and second different focal lengths in said first and second light beams for producing first and second converging light beams;

first and second photodetectors disposed in the first and second converging light beams, respectively, at first and second different distances from said first and second focusing lenses in which the ratios of the first and second distances to the first and second focal lengths, respectively, are the same; and means including a differential amplifier for receiving electrical outputs from said first and second photodetectors.

* * * * *